(12) United States Patent
Shen

(10) Patent No.: US 8,199,825 B2
(45) Date of Patent: Jun. 12, 2012

(54) REDUCING THE RESOLUTION OF MEDIA DATA

(75) Inventor: Bo Shen, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1750 days.

(21) Appl. No.: 11/011,866

(22) Filed: Dec. 14, 2004

(65) Prior Publication Data

US 2006/0126736 A1 Jun. 15, 2006

(51) Int. Cl.
- *H04N 7/46* (2006.01)
- *H04N 7/36* (2006.01)
- *H04N 7/50* (2006.01)
- *H04N 7/26* (2006.01)

(52) U.S. Cl. ......... 375/240.24; 375/240.13; 375/240.25; 375/240.26

(58) Field of Classification Search ............. 375/240.16, 375/240.21, 240.24, 240.13, 240.25
See application file for complete search history.

(56) References Cited

U.S. PATENT DOCUMENTS

| | | | | |
|---|---|---|---|---|
| 5,926,573 | A * | 7/1999 | Kim et al. ................. | 382/239 |
| 6,249,549 | B1 * | 6/2001 | Kim ........................ | 375/240.21 |
| 6,628,714 | B1 * | 9/2003 | Fimoff et al. ............ | 375/240.16 |
| 6,850,571 | B2 * | 2/2005 | Tardif ...................... | 375/240.21 |
| 7,006,572 | B2 * | 2/2006 | Porikli et al. ............ | 375/240.16 |
| 7,170,932 | B2 * | 1/2007 | Vetro et al. ............... | 375/240 |
| 7,203,237 | B2 * | 4/2007 | Fernandes ................ | 375/240.16 |
| 7,596,179 | B2 * | 9/2009 | Shen et al. ............... | 375/240.16 |
| 7,881,386 | B2 * | 2/2011 | Liang et al. .............. | 375/240.24 |
| 2001/0017891 | A1 * | 8/2001 | Boyce et al. ............. | 375/240.21 |
| 2002/0061065 | A1 * | 5/2002 | Moore ...................... | 375/240.13 |
| 2002/0126752 | A1 * | 9/2002 | Kim .......................... | 375/240.03 |
| 2002/0150159 | A1 * | 10/2002 | Zhong ...................... | 375/240.16 |
| 2003/0016751 | A1 * | 1/2003 | Vetro et al. ............... | 375/240.16 |
| 2003/0161401 | A1 * | 8/2003 | Shen et al. ............... | 375/240.16 |
| 2003/0169818 | A1 * | 9/2003 | Obrador .................. | 375/240.21 |
| 2003/0202583 | A1 * | 10/2003 | Schoenblum ........... | 375/240.08 |
| 2004/0013195 | A1 * | 1/2004 | Panusopone et al. ..... | 375/240.2 |
| 2005/0018771 | A1 * | 1/2005 | Bourge et al. ............ | 375/240.16 |
| 2005/0058196 | A1 * | 3/2005 | Fernandes ................ | 375/240.2 |
| 2005/0129111 | A1 * | 6/2005 | Kurceren et al. ......... | 375/240.03 |

OTHER PUBLICATIONS

Shen, B. et al. "Adaptive Motion-Vector Reampling for Compressed Video Downscaling". _IEEE Transactions on Circuits and Systems for Video Technology_. vol. 9, No. 6 (Sep. 1999): pp. 929-936.*

* cited by examiner

*Primary Examiner* — David Czekaj
*Assistant Examiner* — David N Werner

(57) ABSTRACT

Input data at a first resolution are received from a source. The input data are compressed. The input data can be downsampled to generate compressed downsampled data at a reduced resolution. The compressed downsampled data can be used to generate a frame at the reduced resolution. When the frame is needed as a reference for another frame, the compressed downsampled data can be decoded to generate decompressed downsampled data at the reduced resolution. Motion compensation is performed on the decompressed downsampled data at the second resolution to generate motion compensated decompressed downsampled data used as a reference for a second frame. Thus, by performing motion compensation on downsampled data directly, data processing operations such as transcoding can be accomplished quickly and effectively while saving computing resources.

27 Claims, 6 Drawing Sheets

REDUCING THE RESOLUTION OF MEDIA DATA

TECHNICAL FIELD

Embodiments of the present invention relate to the field of streaming media data. More specifically, embodiments of the present invention relate to reducing the resolution of media data.

BACKGROUND ART

Wireless (as well as wired) networks are able to provide increasingly rich media content to client devices. However, a limitation of some client devices, particularly mobile client devices, is that these devices may not have the resources (e.g., the display real estate) to render the rich content that is traditionally created for more resourceful devices such as desktop computers or DVDs (digital video disks). Moreover, the spectrum of client devices that are available have widely varying capabilities and attributes; that is, a network typically must serve a heterogeneous mix of devices. Furthermore, a wireless network typically has less bandwidth than a conventional wired network. Therefore, there is a need to adapt the original media content to the attributes of a receiving client device as well as to the capabilities of the network. This function is performed by network nodes commonly referred to as transcoders.

A transcoder takes a compressed, high resolution, high bit rate media stream as input, then processes it to produce another compressed media stream, at a reduced resolution and bit rate, as output. The original content may have been coded at, for example, a resolution of 720×480 pixels and a bit rate of two to eight Mbps for DVDs, or at a resolution of 320×240 pixels and a bit rate of 1.5 Mbps for desktop clients connected to the Internet through a T1 line. However, due to the characteristics of mobile communication (e.g., lower bandwidth channels and limited display capabilities), lower bit rates and reduced resolution are desired.

A straightforward method for transcoding media content is to decode (decompress) the original (input) stream, downsample the decoded frames to a smaller size, and re-encode (recompress) the downsampled frames to a lower bit rate. However, this method can consume an extensive amount of the computational resources available on a transcoder. Because a transcoder is expected to conduct sessions with many different types of client devices, and to concurrently conduct as many sessions as possible, the straightforward method is impractical. Thus, it is desirable to develop fast and efficient transcoding methods to reduce the load on computational resources. The present invention provides a novel solution to this need.

Another method for transcoding re-uses motion vectors in the original video, therefore avoiding a costly motion estimation process. Since the derived motion vectors may not be perfectly aligned with the old ones, a drift compensation loop consisting of inverse transform and motion compensation (or transform domain motion compensation) modules is required. However, the motion compensation is always performed based on full macroblock, which makes the drift compensation based on full-resolution frames inevitable. This renders the drift compensation loop as the next computational bottleneck.

DISCLOSURE OF THE INVENTION

Embodiments of the present invention pertain to a method and system for quickly and efficiently reducing the resolution of media data, thereby reducing the load on computational resources as well as reducing memory requirements of a transcoder. In one embodiment, input data at a first resolution are received from a source. The input data are compressed. The input data are downsampled to generate compressed downsampled data at a reduced resolution. The compressed downsampled data are used to generate a frame at the reduced resolution. When the frame is needed as a reference for another frame, the compressed downsampled data are decoded to generate decompressed downsampled data at the reduced resolution. Motion compensation is performed on the decompressed downsampled data at the second resolution to generate motion compensated decompressed downsampled data used as a reference for a second frame.

Maximal information from the input data is reused and memory requirements for storing the downsampled data are reduced because only a reduced resolution image is stored. Thus, by performing motion compensation on downsampled data directly, data processing operations such as transcoding can be accomplished quickly and effectively while saving computing resources.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. In other instances, well known methods, procedures, components, and circuits have not been described in detail as not to unnecessarily obscure aspects of the present invention.

Aspects of the present invention may be practiced on a computer system that includes, in general, a processor for processing information and instructions (e.g., program code), random access (volatile) memory (RAM) for storing information and instructions, read-only (non-volatile) memory (ROM) for storing static information and instructions, a data storage device such as a magnetic or optical disk and disk drive for storing information and instructions, in which the volatile memory, non-volatile memory, and data storage device are also referred to as computer-usable storage media, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor. The computer system may also include an input/output device for providing a physical communication link between the computer system and a network, using either a wired or a wireless communication interface.

Figure 1A:
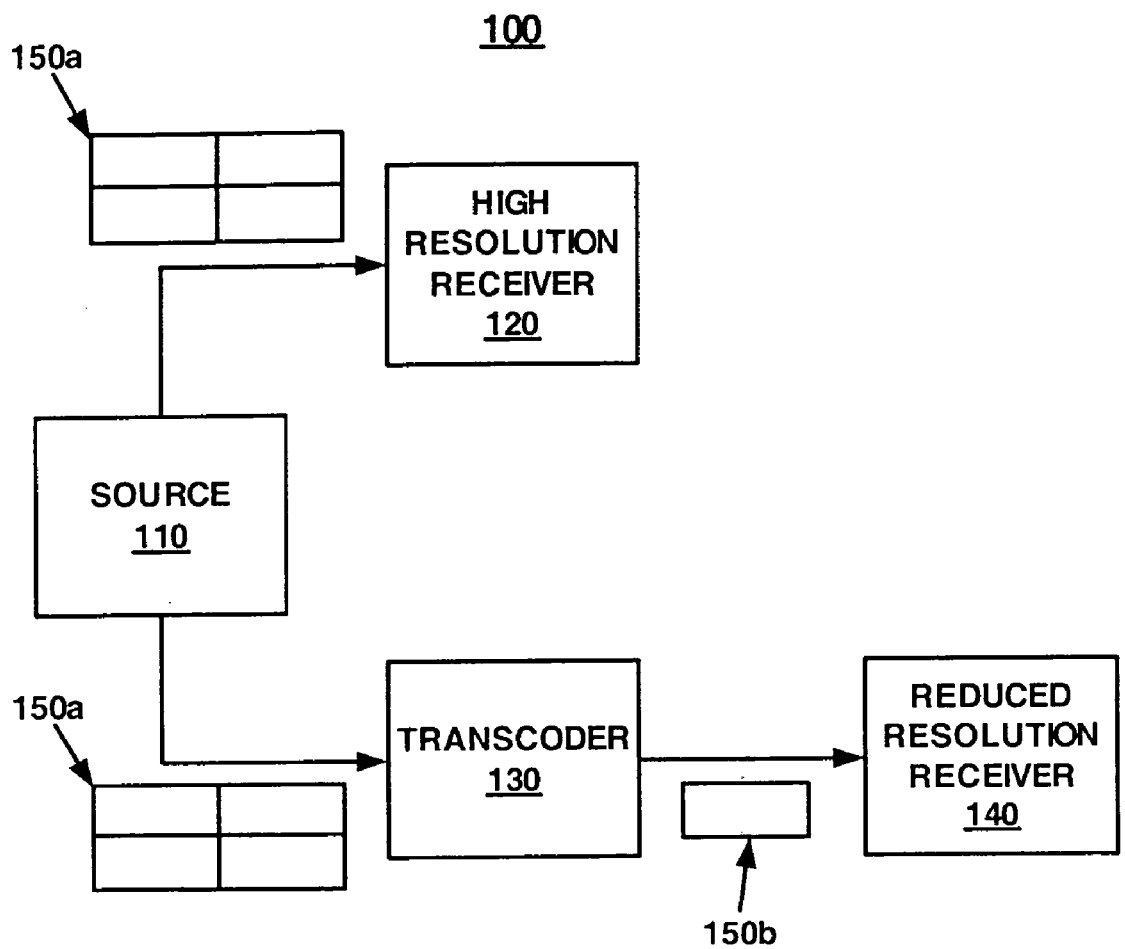
FIG. 1A is a block diagram of an exemplary hybrid wired/wireless network upon which embodiments of the present invention may be practiced.

FIG. 1A is a block diagram of an exemplary hybrid wired/wireless network 100 upon which embodiments of the present invention may be practiced. In hybrid wired/wireless network 100, media data (e.g., video, audio, image, graphic and/or Web page data) are streamed to fixed clients (stationary receiving nodes) via a wired link and to mobile clients (moving receiving nodes) via a wireless link.

In the present embodiment, hybrid wired/wireless network 100 includes a wired sender (source 110), a first client (wired high-resolution receiver 120), and a second client (wireless reduced-resolution receiver 140). In this embodiment, source 110 generates a full-bandwidth, high-resolution frame 150*a* that is sent to high-resolution receiver 120. A transcoder 130, placed at source 110, at reduced-resolution receiver 140, or at an intermediate node such as a wired/wireless gateway, transcodes the frame 150*a* into a lower-bandwidth and/or reduced-resolution frame 150*b* that is then sent to reduced-resolution receiver 140. In addition, the reduced resolution video can be transcoded to another video format. For example, source 110 could generate MPEG-1, MPEG-2 or H.263 video, then transcoder 130 transcodes the frame 150*a* into a lower-bandwidth and/or reduced-resolution frame 150*b* that is encoded in the MPEG-4 format and sent to receiver 140.

Figure 1B:
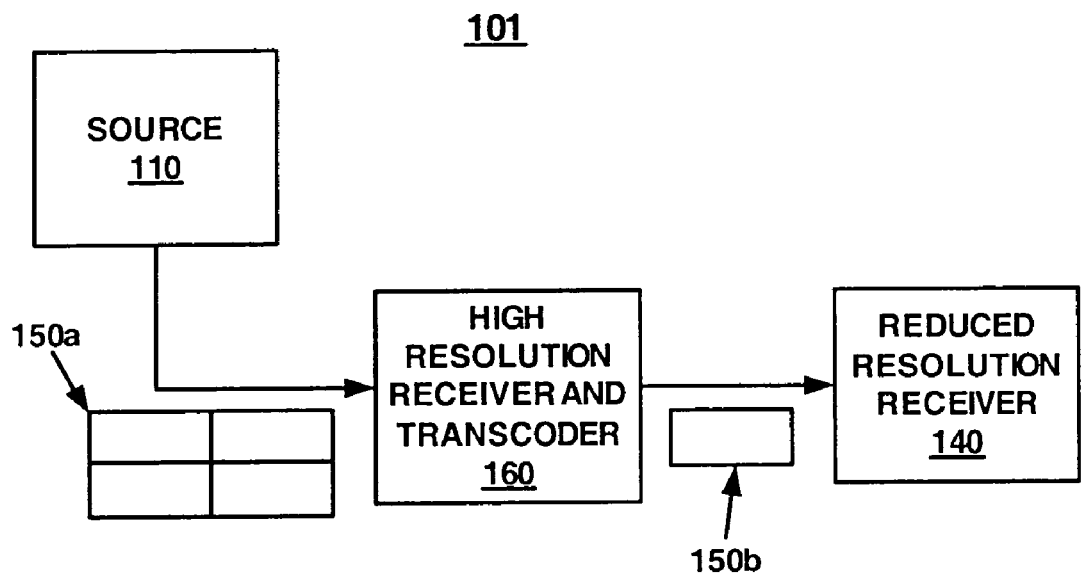
FIG. 1B is a block diagram of an exemplary wireless network upon which embodiments of the present invention may be practiced.

FIG. 1B is a block diagram of an exemplary wireless network 101 (e.g., a wireless appliance network) upon which embodiments of the present invention may be practiced. In typical wireless appliance networks, mobile senders and receivers (clients) communicate with one another over wireless links. A sender's coverage area is limited by the power of the transmitted signal. Relay devices can be used to extend the wireless coverage area when intended receivers are beyond the immediate coverage area of the sender. In the case of heterogeneous clients (e.g., receiving nodes having different display, power, computational, and communication characteristics and capabilities), transcoders can be used to adapt a data stream for a particular receiver or communication link. Transcoding can be performed in a relay device or in a receiver that also acts as a relay. Transcoding can also be performed by the sender or by the receiving node.

In the present embodiment, wireless network 101 includes a wireless sender (source 110), a high-resolution receiver and transcoder 160, and a reduced-resolution receiver 140. In wireless network 101, the high-resolution receiver 160 receives and transcodes the high-resolution frame 150*a*, and relays the resulting lower-bandwidth and/or reduced-resolution frame 150*b* to the reduced-resolution receiver 140.

Referring to FIGS. 1A and 1B, both hybrid wired/wireless network 100 and wireless network 101 use network transcoders to transcode frame 150*a* into lower bandwidth and/or reduced-resolution frame 150*b* that matches the display capabilities of the target wireless nodes (e.g., reduced-resolution receiver 140). Generally speaking, these networks illustrate how network transcoding can enable efficient use of wireless spectrum and receiver resources by transcoding media data into formats better suited for transmission over particular channels and for the capabilities of the receiving nodes.

Figure 2:
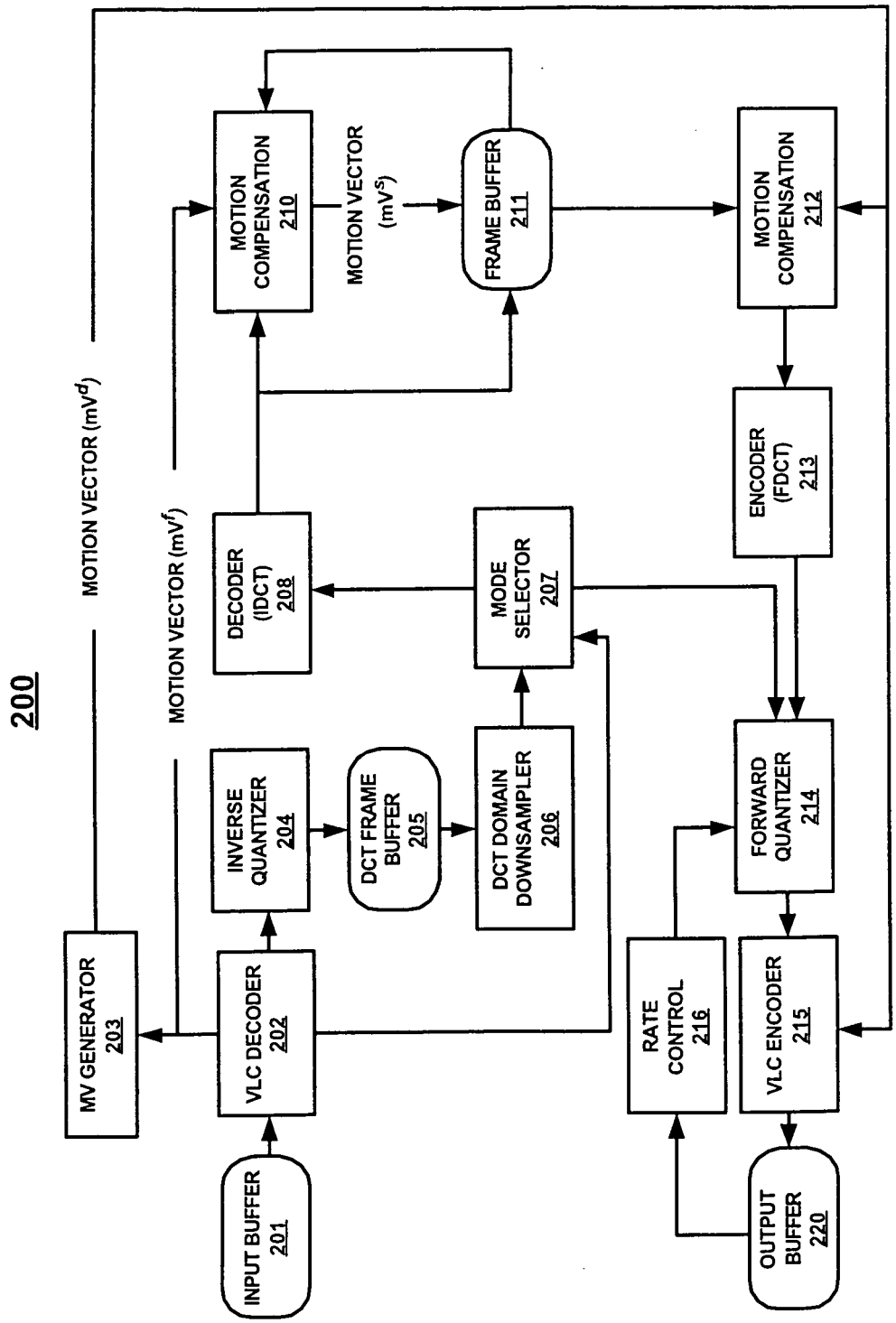
FIG. 2 illustrates data flow through a system for reducing the resolution of media data according to one embodiment of the present invention.

FIG. 2 illustrates data flow through the functional blocks of a system 200 (e.g., a transcoder) for reducing the resolution of media data according to one embodiment of the present invention. In this embodiment, system 200 is shown as a separate device that is situated in a network between the source and recipients of the media data. However, it is appreciated that system 200 may instead be integrated with the source of the media data or with the receiving (client) device. Also, although the functional blocks of system 200 are illustrated as separate elements, it is appreciated that one or more of the functional blocks may be combined into a single block, and that the functions of one or more blocks may be performed by a single hardware component or software module.

In one embodiment, system 200 is implemented in a hardware device. In one embodiment, the hardware device is a field programmable gate array (FPGA). In another embodiment, the hardware device is a digital signal processor (DSP). It should be appreciated that embodiments of the present invention may be implemented in any type of integrated circuit.

In the present embodiment, the general flow of data through system 200 is from input buffer 201 to output buffer 220. Input buffer 201 receives compressed (encoded) input data from a data source. The data source may be a data storage device such as a magnetic or optical disk, or the input data may be streamed to system 200 from another device. Output data are also compressed, and the output data can be written to a data storage device or streamed to a client device via a wired and/or wireless network.

In the present embodiment, the input and output data include a plurality of frames comprising video data. The input data are at a first resolution and the output data are at a second resolution that is reduced relative to the first resolution. Each frame may be separated into macroblocks.

In one embodiment, the input data are MPEG (Moving Pictures Experts Group) video data. In the case of P-pictures and B-pictures, using techniques known in the art, a frame/macroblock is predicted from another frame (or macroblock) using a motion estimation technique. In the case of I-pictures, the frame/macroblock is independent of other frames/macroblocks. Because MPEG employs motion-compensated motion estimation and discrete cosine transform-based frequency domain compression techniques, embodiments of the present invention are described for videos compressed according to these techniques. For example, the reduced resolution transcoding can be performed for MPEG-1, MPEG-2, MPEG-4 and H.263 video data. However, other types of video compression schemes can be used in accordance with the various embodiments of the present invention.

From input buffer 201, variable length code (VLC) decoder 202 parses the input data stream. Motion vectors are passed to the motion compensation module 212 and to motion vector (MV) generator 203 to generate new motion vectors for the downscaled (reduced resolution) version of the data.

In one embodiment, MV generator 203 generates new motion vectors ($mv^d$) from the original motion vectors (that is, the new motion vectors are generated using the motion vectors from the input data in input buffer 201). In one such embodiment, MV generator 203 generates the new motion vectors by taking the average, or a weighted average, of the original motion vectors. One averaging approach is known in the art as the align-to-average weighting approach, another is known as the align-to-best predicted macroblock weighting approach, and another is known as the align-to-worst predicted macroblock weighting approach. Any of these approaches, or some other approach, may be used with the various embodiments of the present invention.

Continuing with reference to FIG. 2, in the present embodiment, the input data are compressed according to a discrete cosine transform-based compression scheme. In this embodiment, the discrete cosine transform (DCT) data are sent to inverse quantizer 204. The compressed input data is directed to DCT frame buffer 205. DCT domain downsampler 206 generates downsampled DCT data.

In the present embodiment, mode selector 207 determines, for each output macroblock, whether the macroblock is characterized as either a first or a second coding type. The first coding type is commonly referred to as "inter" while the second coding type is commonly referred to as "intra." An inter-macroblock (characterized as the first coding type) is dependent on the content of another macroblock. That is, an inter-macroblock is a predicted macroblock that is derived from another macroblock using motion information. An intra-macroblock (characterized as the second coding type) is independent of the content of another macroblock and does not contain any motion information.

Still referring to FIG. 2, in the present embodiment, mode selector 207 determines the number of input inter-macroblocks and the number of input intra-macroblocks in the set of macroblocks that are used to generate an output macroblock. Using a downsample-by-two operation as an example, four input macroblocks are used to generate one output macroblock; these four input macroblocks will include some combination of inter- and intra-macroblocks.

In accordance with the present embodiment of the present invention, if there are K input macroblocks involved in generating one output macroblock, a first threshold N and a second threshold M can be defined, where M<N<K. In the present embodiment, mode selector 207 decides that if at least M of the K input macroblocks are intra-macroblocks, then the output macroblock will be coded as an intra-macroblock. If less than M of the K input macroblocks are intra-blocks, the output macroblock will be coded as an inter-macroblock.

In addition, some unique combinations of the group of input macroblocks may affect the data flow of the transcoding process. Two special groups of input macroblocks are defined as groups of macroblocks that satisfy one of the following constraints: 1) All-Intra (case 1)—all macroblocks are intra coded, and Uni-Inter (case 2)—all macroblocks are inter coded using the same coding type (e.g., all forward predicted), and the motion vectors of all macroblocks are aligned in direction and equal in magnitude. Otherwise, the group of input macroblocks is classified as case 3. Mode selector 207 obtains the information from VLC decoder 202, categories the group of input macroblocks as Case 1 or 2 or 3, and then directs the rest of the transcoding process as follows.

If the input macroblocks are of Case 1 or Case 2, the input transform data is sent to the transform-domain downsampling module 206 to generate down sampled transform data. The result is sent to forward quantizer 214 to generate output. If this group of macroblocks is in reference pictures (e.g., I- or P-pictures), the reconstructed version is needed as reference of future frames. For case 1, inverse transform (IDCT) 208 is performed and the result is saved in reduced-resolution frame buffer 211. For Case 2, inverse transform (IDCT) 208 is performed and motion compensation 210 is further applied using downscaled motion vector ($mv^s$). Note that $mv^s$ is half of $mv^f$ (full resolution motion vector from input) in downscale-by-2 case, and one-third of $mv^f$ in downscale-by-3-case, and so on and so forth. Also note that finer granularity motion compensation should be used in 210. For example, if the input stream uses half-pixel motion compensation, the transcoder should use quarter-pixel motion compensation in downscale-by-2 case. The result is stored in the reduced-resolution frame buffer 211. The result is stored in the reduced-resolution frame buffer 211.

If the input macroblocks are of Case 3, the input transform data is sent to the transform-domain downsampling module 206 to generate down sampled transform data. If this group of macroblocks is in reference pictures (e.g., I- or P-pictures), the reconstructed version is needed as reference of future frames, then, inverse transform (IDCT) 208 is performed and motion compensation 210 is further applied using motion vector ($mv^s$).

The data in frame buffer 211 are used to generate a new residual based on the new motion vector ($mv^d$) from MV generator 203 (motion compensation 212). The residual is encoded (forward DCT, or FDCT) in encoder 213 and sent to forward quantizer 214 along with the data generated directly by DCT domain downsampler 206. In the present embodiment, the step size of the quantizer is controlled by rate control 216 in order to achieve a specified (target) output bit rate. VLC encoder 215 then generates the output bit stream.

In one embodiment, rate control 216 determines the quantizer step size using information from the compressed input data. In this embodiment, rate control 216 first estimates the number of bits available to code the data from encoder 213 and DCT domain downsampler 206. Rate control 216 then computes a reference value of the quantization parameter based on the fullness of output buffer 220 and the target bit rate. Next, rate control 216 derives the value of the quantization parameter from the reference value and according to the spatial activity derived from the DCT coefficient activity in the input data. In essence, the DCT coefficient activity refers to the variation in the pixel domain block.

Thus, according to the various embodiments of the present invention, frame buffer 211 stores downsampled versions of the macroblocks (at a second resolution that is reduced relative to the first resolution). The motion compensation is performed directly on the downsampled version of the macroblocks at motion compensation 212. In one embodiment, the motion compensation performed directly on the downsampled version is only performed when the original (pixel domain) frame is needed as a reference for another frame. Similarly, the output of system 200 is either encoded from the downsampled pixel domain version through motion compensation (using the new motion vectors generated by MV generator 203), or directly from the downsampled DCT version. Mode selector 207 functions to direct which data processing (transcoding) functions are employed to accomplish the above.

Figure 3:
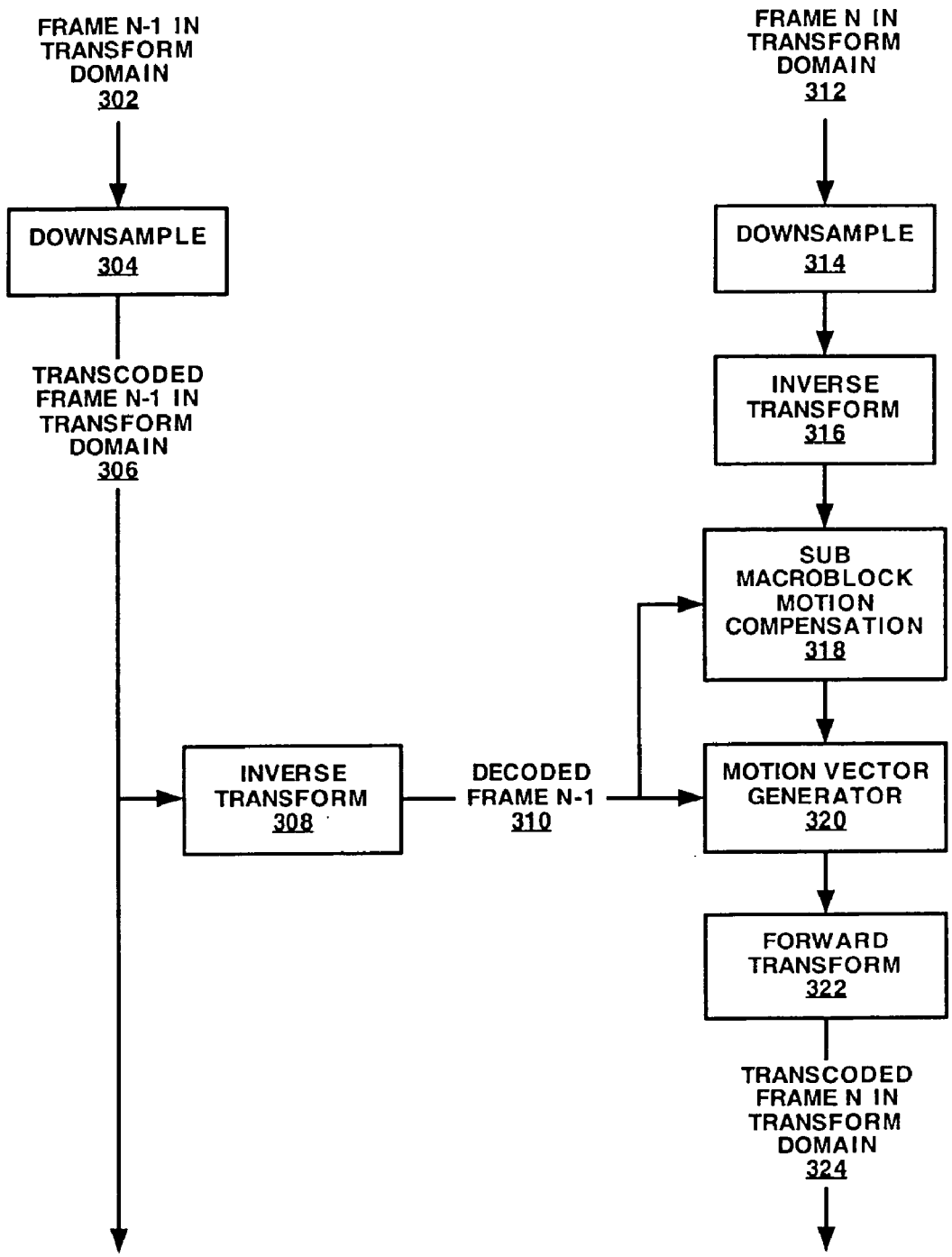
FIG. 3 illustrates a method for processing media data according to one embodiment of the present invention.

FIG. 3 illustrates a data flow 300 for reducing the resolution of media data according to one embodiment of the present invention. The embodiment illustrated by FIG. 3 is generally applicable to I-pictures; for P-pictures, to Cases 3 that was described above (e.g., the group of macroblocks are neither All-intra nor Uni-inter); and for B-pictures, to Case 3. It is appreciated that the operations illustrated in FIG. 3 can be combined with other data processing operations. In one embodiment, the operations of FIG. 3 are performed using a transcoder such as that described by FIG. 2.

FIG. 3 depicts the flow of data at two consecutive times (t and t+1). At time t, an original data frame N-1 302 is received. In one embodiment, frame N-1 302 is an intra frame. The data included in frame N-1 302 have been compressed, and frame N-1 302 is in the transform domain. For simplicity of discussion, frame N-1 302 is described as comprising 4×4 macroblocks; however, it is understood that an array of macroblocks may have different dimensions.

According to the present embodiment of the present invention, downsample operation 304 is performed on the data in frame N-1 302 while the data are still compressed to generate transcoded frame N-1 306. In one embodiment, where downsample operation 304 is a downsample by two operation, transcoded frame N-1 306 comprises compressed data in 2×2 macroblocks. Transcoded frame N-1 306 is output by the transcoder. Next, inverse transform operation 308 is performed to decode the data. In one embodiment, inverse transform operation 308 is an inverse DCT operation to generate decoded frame N-1 310. Thus, in one embodiment, decoded frame N-1 310 comprises decompressed data in 2×2 macroblocks. In one embodiment, decoded frame N-1 310 is stored in a frame buffer.

At time t, an original data frame N 312 is received. The data included in frame N 312 have been compressed, and frame N 312 is in the transform domain. In one embodiment, frame N 312 is an inter frame. According to the present embodiment of the present invention, downsample operation 314 is performed on the data in frame N 312 while the data are still compressed. Next, inverse transform operation 316 is performed to decode the data. In one embodiment, inverse transform operation 316 is an inverse DCT operation.

Sub-macroblock motion compensation 318 is then performed based on decoded frame 310 and the output of inverse transform operation 316. Motion vector estimation 320 is then performed based on decoded frame 310 and the output of sub-macroblock motion compensation 318. Next, forward transform operation 322 is performed on the output of motion vector estimation 320, to generate transcoded frame N 324, which is in the transform domain. In one embodiment, forward transform operation 322 is a DCT operation. Transcoded frame N 324 is output by the transcoder.

In the present embodiment, inverse transform operation 316 is performed on a downsampled frame. Thus, the computation complexity of the inverse transform operation 316 is reduced over a non-downsampled frame. Inter frames are reconstructed using sub-macroblock motion compensation operation 318, and only one set of reduced-resolution buffers is required. The memory requirement of the transcoder is reduced by a factor of $3(DF)^2$, where DF is the downscaling factor.

Thus, in the embodiment of FIG. 3, for any downscaling factor, one downsampling operation in the transform domain and one inverse transform operation are required to generate transcoded frame N 324. In one prior-art solution, generating a transcoded frame requires $DF^2$ inverse transform operations, where DF is the downscaling factor, and one downsampling operation. For example, for a downscaling factor of two, four inverse transform operations are required, and for a downscaling factor of four, sixteen inverse transform operations are required. Thus, for a downsample-by-two operation, one-fourth the number of inverse transform operations are needed relative to the prior art and for downsample-by-four operations, one-sixteenth the number of inverse transform operations are needed relative to the prior art.

In general, according to the present embodiment of the present invention, a transcoding session is considered at the macroblock level. For N to K input intra-macroblocks and an output intra-macroblock, downsampling in the compressed (e.g., DCT) domain is directly applied to generate a downsampled output macroblock. The motion compensation is based on the downsampled output macroblock, thus eliminating any upsampling requirement, as well as eliminating the number of inverse transform operations.

Figure 4:
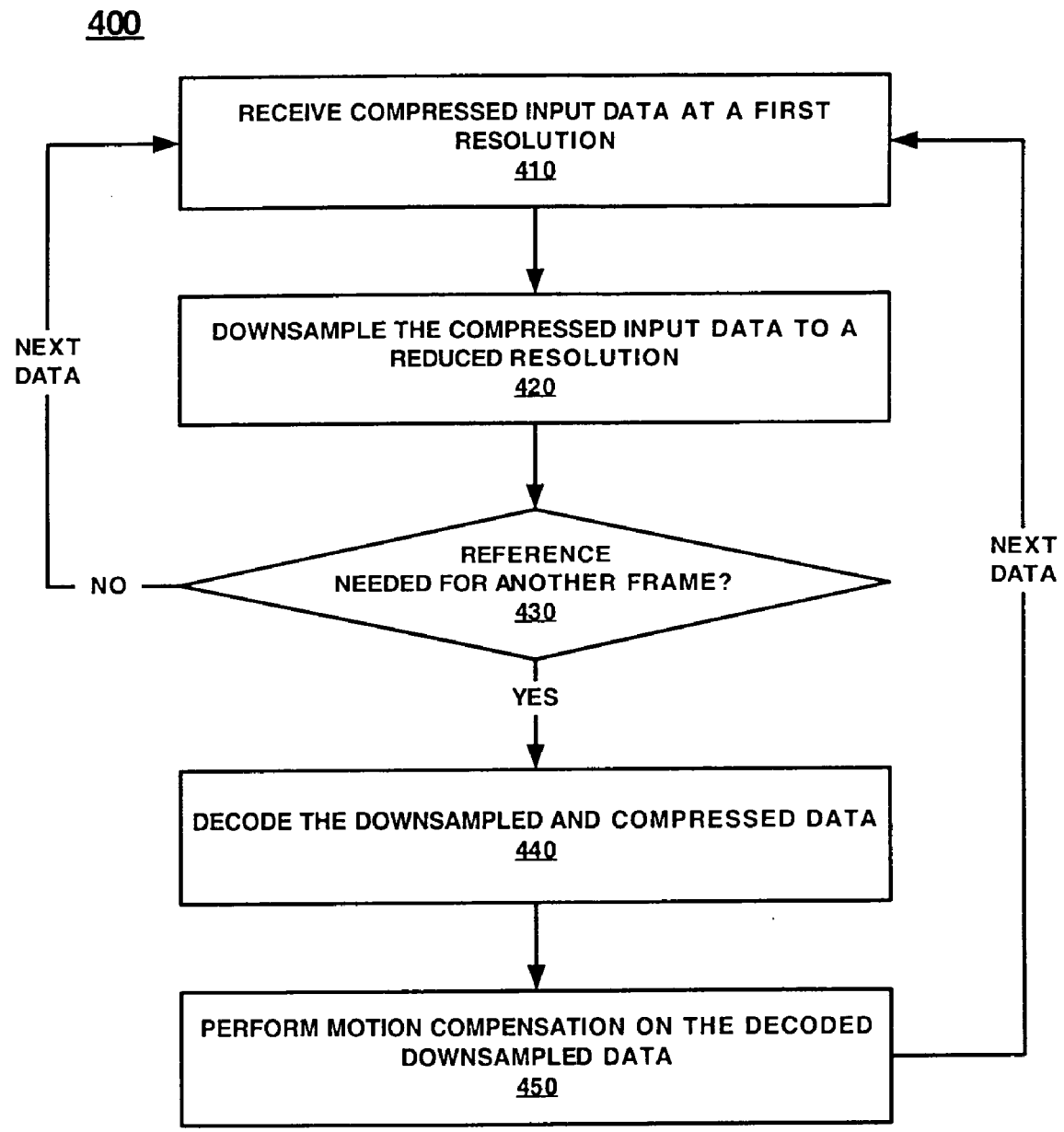
FIG. 4 is a flowchart of one embodiment of a method for reducing the resolution of media data in accordance with the present invention.

FIG. 4 is a flowchart 400 of one embodiment of a method for reducing the resolution of media data in accordance with the present invention. Flowchart 400 includes processes of the present invention that, in one embodiment, are carried out by a processor under the control of computer-readable and computer-executable instructions (e.g., program code). The computer-readable and computer-executable instructions reside, for example, in a computer-usable storage medium, such as computer usable volatile memory, computer usable non-volatile memory, and/or a data storage device.

In step 410, in the present embodiment, compressed data at a first resolution are received. In step 420, a downsampling operation is performed on the compressed data to reduce the resolution of the data. In step 430, if the compressed downsampled data are not needed as a reference for another frame, then flowchart 400 returns to step 410. Otherwise, flowchart 400 proceeds to step 440.

In step 440, in the present embodiment, the compressed downsampled data are decoded. In step 450, motion compensation is performed on the decompressed downsampled data at the second resolution to generate motion compensated decompressed downsampled data used as a reference for a second frame. Flowchart 400 then returns to step 410 for processing of the next input data.

Figure 5:
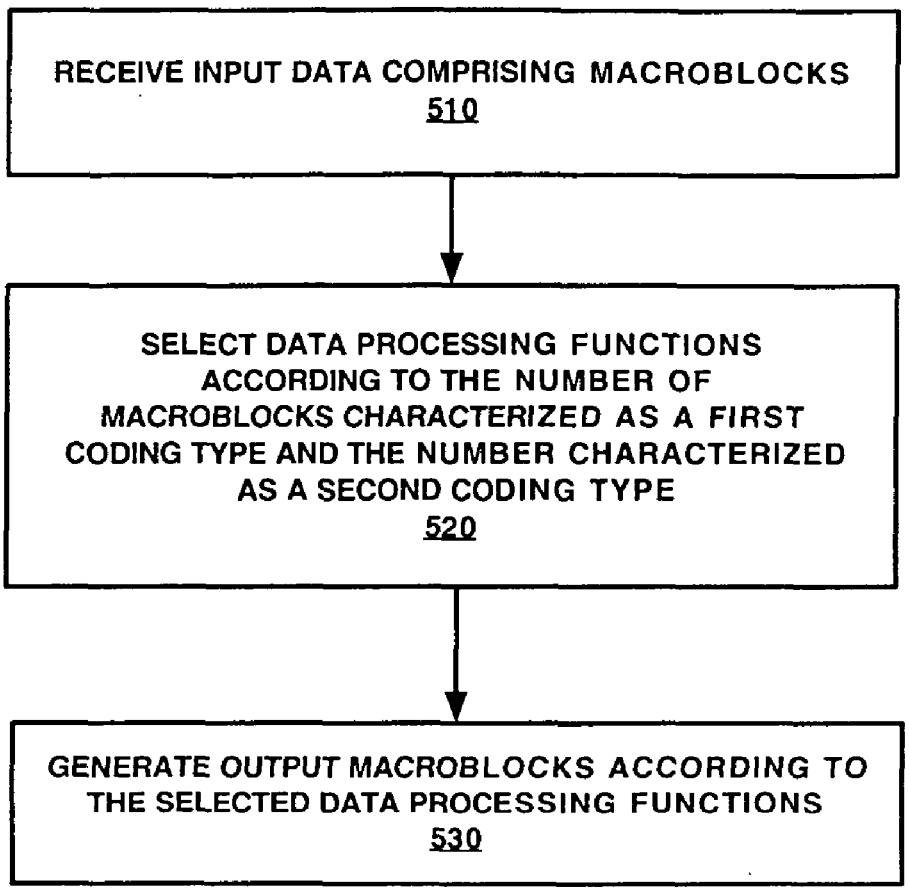
FIG. 5 is a flowchart of another embodiment of a method for reducing the resolution of media data in accordance with the present invention.

FIG. 5 is a flowchart 500 of another embodiment of a method for reducing the resolution of media data in accordance with the present invention. Flowchart 500 includes processes of the present invention that, in one embodiment, are carried out by a processor under the control of computer-readable and computer-executable instructions (e.g., program code). The computer-readable and computer-executable instructions reside, for example, in a computer-usable storage medium, such as computer usable volatile memory, computer usable non-volatile memory, and/or a data storage device.

In step 510, in the present embodiment, input data comprising a number of macroblocks are received. Each of the macroblocks is characterized as either a first coding type or as a second coding type. Thus, the input data will include either all macroblocks of a first coding type, all macroblocks of a second coding type, or some combination of macroblocks of the first and second coding types.

In step 520, in the present embodiment, data processing functions are selected according to the number of input macroblocks characterized as the first coding type and the number of input macroblocks characterized as the second coding type. In one embodiment, the coding types of the input macroblocks are used to determine the coding type of an output macroblock derived from the input macroblocks. In this latter embodiment, the data processing functions are selected according to the coding type of the output macroblock.

In step 530 of FIG. 5, in the present embodiment, output macroblocks are generated according to the selected data processing functions. In one embodiment, the data processing functions include those described in conjunction with FIG. 4 above.

In summary, in its various embodiments, the present invention provides a fast and efficient transcoding method to reduce the load on computational resources. Motion and transform domain information is maximally reused, and motion compensation is performed directly on a sub-macroblock of a reduced resolution frame. Computational load is thereby reduced proportional to the downscaling factor. Moreover, less memory is required because only a reduced resolution frame buffer is required. Data processing is performed entirely in the compressed domain, improving processing speed and decreasing computational overhead.

The preferred embodiment of the present invention, reducing the resolution of media data, is thus described. While the present invention has been described in particular embodiments, it should be appreciated that the present invention should not be construed as limited by such embodiments, but rather construed according to the following claims.

What is claimed is:

1. A method for reducing the resolution of media data, said method comprising:
    receiving input data comprised of compressed data for a frame of a plurality of frames at a hardware transcoder, wherein said frame is at a first resolution, wherein each frame of said plurality of frames comprises a plurality of macroblocks, wherein a macroblock is characterized as a first coding type if said macroblock is dependent on a macroblock from another frame and is otherwise characterized as a second coding type;
    downsampling said input data to generate compressed downsampled data at a second resolution that is reduced relative to said first resolution at said hardware transcoder, said compressed downsampled data used to generate a frame at said second resolution;
    selecting data processing functions according to a single first number of macroblocks of said frame characterized as said first coding type and a single second number of macroblocks characterized as said second coding type, wherein said single first number of macroblocks of said frame characterized as said first coding type is greater than said single second number of macroblocks characterized as said second coding type;
    decoding said compressed downsampled data to generate decompressed downsampled data at said second resolution at said hardware transcoder; and
    performing motion compensation on said decompressed downsampled data at said second resolution to generate motion compensated decompressed downsampled data used as a reference for a second frame at said hardware transcoder.

2. The method as recited in claim 1 further comprising encoding said motion compensated decompressed downsampled data to generate said second frame at said second resolution at said hardware transcoder.

3. The method as recited in claim 1 wherein said input data comprise motion vectors, wherein said performing motion compensation comprises:
    generating motion vectors for said frame at said second resolution using said motion vectors from said input data.

4. The method as recited in claim 3 wherein said motion vectors for said frame at said second resolution are generated by averaging said motion vectors from said input data.

5. The method as recited in claim 1 wherein said input data are compressed according to a discrete cosine transform-based compression scheme, wherein said input data comprise discrete cosine transform (DCT) coefficients.

6. The method as recited in claim 4 comprising:
    generating an output data stream comprising said frame at said second resolution at said hardware transcoder; and
    determining a bit rate for said output data stream using said DCT coefficients from said input data at said hardware transcoder.

7. The method as recited in claim 6 wherein said input data are encoded according to a first compression scheme and said output data stream are encoded according to a second compression scheme.

8. The method as recited in claim 1 wherein said media data are selected from the group consisting of: video data, audio data, image data, graphic data, and web page data.

9. The method as recited in claim 1 wherein said method for reducing the resolution of media data is implemented in a hardware device.

10. The method as recited in claim 1 wherein said frame is intra frame coded and wherein said second frame is inter frame coded.

11. A system for reducing the resolution of media data, said system comprising:
    an input buffer adapted to receive input data at a first resolution, said input data comprising compressed data for a plurality of macroblocks, wherein a macroblock is characterized as a first coding type if said macroblock is dependent on a macroblock from another frame and is otherwise characterized as a second coding type;
    a downsampler coupled to said input buffer, said downsampler adapted to generate compressed downsampled data at a second resolution that is reduced relative to said first resolution;
    a mode selector coupled to said downsampler, said mode selector adapted to select data processing functions according to a single first number of macroblocks characterized as said first coding type and a single second number of macroblocks characterized as said second coding type, wherein said single first number of macroblocks of said frame characterized as said first coding type is greater than said single second number of macroblocks characterized as said second coding type;
    a decoder coupled to said downsampler, said decoder adapted to generate decompressed downsampled data;
    a reduced resolution frame buffer coupled to said decoder, said reduced resolution frame buffer adapted to store said decompressed downsampled data; and
    a motion compensator coupled to said decoder and said frame buffer, said motion compensator adapted to generate motion vectors for a frame at said second resolution using motion vectors from said input data and said decompressed downsampled data.

12. The system of claim 11 wherein said system is implemented in an integrated hardware device.

13. The system of claim 12 wherein said integrated hardware device is a field programmable gate array (FPGA).

14. The system of claim 11 comprising:
    a motion vector generator coupled to said input buffer, said motion compensator adapted to generate motion vectors for a frame at said second resolution using said motion vectors from said input data.

15. The system of claim 11 comprising:
    an encoder coupled to said motion compensator, said encoder adapted to generate compressed downsampled data.

16. The system of claim 15 comprising:
    a rate controller coupled to said encoder, said rate controller adapted to determine a quantization step size for a frame at said second resolution according to quantization parameters from said input data.

17. The system of claim 11 wherein said input data are compressed according to a discrete cosine transform-based compression scheme, wherein said input data comprise discrete cosine transform (DCT) coefficients.

18. The system of claim 11 wherein said media data are selected from the group consisting of: video data, audio data, image data, graphic data, and web page data.

19. A computer-usable storage medium having computer-readable program code embodied therein for causing a computer system to perform a method for transcoding media data, said method comprising:
  accessing input data residing in a buffer, said input data comprising compressed data for a frame of a plurality of frames, wherein said frame is at a first resolution, wherein each frame of said plurality of frames comprises a plurality of macroblocks, wherein a macroblock is characterized as a first coding type if said macroblock is dependent on a macroblock from another frame and is otherwise characterized as a second coding type;
  generating compressed downsampled data by downsampling said input data, said compressed downsampled data at a second resolution that is reduced relative to said first resolution, said compressed downsampled data used to generate a frame at said second resolution;
  selecting data processing functions according to a single first number of macroblocks of said frame characterized as said first coding type and a single second number of macroblocks characterized as said second coding type, wherein said single first number of macroblocks of said frame characterized as said first coding type is greater than said single second number of macroblocks characterized as said second coding type;
  generating decompressed downsampled data at said second resolution by decoding said compressed downsampled data; and
  performing motion compensation on said decompressed downsampled data at said second resolution to generate motion compensated decompressed downsampled data used as a reference for a second frame.

20. The computer-usable storage medium as recited in claim 19 wherein said method further comprises encoding said motion compensated decompressed downsampled data to generate said second frame at said second resolution.

21. The computer-usable storage medium as recited in claim 19 wherein said input data comprise motion vectors, wherein said performing motion compensation comprises:
  generating motion vectors for said frame at said second resolution using said motion vectors from said input data.

22. The computer-usable storage medium as recited in claim 21 wherein said motion vectors for said frame at said second resolution are generated by averaging said motion vectors from said input data.

23. The computer-usable storage medium as recited in claim 19 wherein said input data are compressed according to a discrete cosine transform-based compression scheme, wherein said input data comprise discrete cosine transform (DCT) coefficients.

24. The computer-usable storage medium as recited in claim 23 wherein said method further comprises:
  generating an output data stream comprising said frame at said second resolution; and
  determining a bit rate for said output data stream using said DCT coefficients from said input data.

25. The computer-usable storage medium as recited in claim 24 wherein said input data are encoded according to a first compression scheme and said output data stream are encoded according to a second compression scheme.

26. The computer-usable storage medium as recited in claim 19 wherein said media data are selected from the group consisting of: video data, audio data, image data, graphic data, and web page data.

27. The computer-usable storage medium as recited in claim 19 wherein said frame is intra frame coded and wherein said second frame is inter frame coded.

* * * * *